(12) United States Patent
Haida et al.

(10) Patent No.: US 9,963,046 B2
(45) Date of Patent: May 8, 2018

(54) MECHATRONIC UNLOCKING MEANS

(75) Inventors: Stefan Haida, Remscheid (DE); Jeetendra Khare, Pune (IN)

(73) Assignee: Adient Luxembourg Holding S.A.R.L., Luxembourg (LU)

( * ) Notice: Subject to any disclaimer, the term of this patent is extended or adjusted under 35 U.S.C. 154(b) by 1240 days.

(21) Appl. No.: 13/384,147

(22) PCT Filed: Jul. 14, 2010

(86) PCT No.: PCT/EP2010/004295
§ 371 (c)(1),
(2), (4) Date: Mar. 27, 2012

(87) PCT Pub. No.: WO2011/023262
PCT Pub. Date: Mar. 3, 2011

(65) Prior Publication Data
US 2012/0174692 A1 Jul. 12, 2012

(30) Foreign Application Priority Data
Jul. 15, 2009 (DE) ........................ 10 2009 033 491

(51) Int. Cl.
*F16C 1/10* (2006.01)
*B60N 2/02* (2006.01)
*E05B 81/24* (2014.01)
*E05B 79/20* (2014.01)

(52) U.S. Cl.
CPC ............ *B60N 2/0232* (2013.01); *E05B 79/20* (2013.01); *E05B 81/25* (2013.01); *Y10T 74/18968* (2015.01)

(58) Field of Classification Search
CPC ........... Y10T 74/2048; Y10T 74/20486; Y10T 74/20462; Y10T 74/20402; Y10T 74/20073; Y10T 74/20408; B60N 2/0232
USPC ............. 74/505, 506, 502.6, 500.5, 501.5 H, 74/501.5 R, 502.4, 473.19; 296/35.1; 248/583, 634; 292/201, DIG. 23
See application file for complete search history.

(56) References Cited

U.S. PATENT DOCUMENTS 3,028,199 A    4/1962   Beierbach et al.
4,232,565 A *  11/1980  Leonheart .............. B62K 23/04
                                                          74/104
4,448,381 A    5/1984   Anspaugh et al.
(Continued)

FOREIGN PATENT DOCUMENTS

DE    8432489 U1   2/1985
DE    4129934 A1   3/1993
(Continued)

OTHER PUBLICATIONS

Machine translation of WO 2010010471, Jan. 26, 2015.*
(Continued)

*Primary Examiner* — Richard W Ridley
*Assistant Examiner* — Brian J McGovern
(74) *Attorney, Agent, or Firm* — Fletcher Yoder, P.C.

(57) ABSTRACT

A drive device for a Bowden control comprises at least one electric actuator and a mechanism connected to the Bowden control. The actuator and mechanism are surrounded by at least one housing. The housing comprises a closable cover in a connecting region between the mechanism and the Bowden control.

3 Claims, 10 Drawing Sheets

(56) References Cited

U.S. PATENT DOCUMENTS

| | | | | |
|---|---|---|---|---|
| 4,779,927 | A * | 10/1988 | Trutter | B60N 2/366 292/DIG. 38 |
| 5,909,066 | A * | 6/1999 | Nanba | H02K 41/031 310/12.14 |
| 6,371,537 | B1 * | 4/2002 | Vige | E05B 81/14 292/201 |
| 2003/0094841 | A1 | 5/2003 | McMillen et al. | |
| 2003/0227203 | A1 | 12/2003 | Mundell | |
| 2005/0093685 | A1 * | 5/2005 | Kachouh | B60N 2/0244 340/438 |
| 2007/0126244 | A1 * | 6/2007 | Ilea | E05B 81/14 292/201 |
| 2007/0216211 | A1 * | 9/2007 | Mori | A47C 7/38 297/410 |
| 2008/0023613 | A1 * | 1/2008 | Brewer | B60N 2/0232 248/429 |
| 2008/0289440 | A1 * | 11/2008 | Denk | H02K 7/09 74/89.34 |
| 2010/0259120 | A1 * | 10/2010 | Karaki | B60N 2/0232 310/83 |

FOREIGN PATENT DOCUMENTS

| | | | |
|---|---|---|---|
| DE | 19642993 | A1 | 4/1997 |
| DE | 10021863 | A1 | 11/2001 |
| DE | 20320419 | U1 | 7/2004 |
| DE | 202006006083 | U1 | 9/2007 |
| DE | 102006037363 | B3 | 2/2008 |
| DE | 202007011092 | U1 | 12/2008 |
| DE | 102008064458 | A1 * | 7/2010 ........... B60N 2/0232 |
| DE | 212006000002 | U1 | 1/2012 |
| EP | 1568539 | A1 | 2/2005 |
| JP | H04302681 | | 10/1992 |
| JP | H074731 | | 1/1995 |
| JP | 10-300515 | | 11/1998 |
| JP | 2002129813 | | 5/2002 |
| JP | 2004204491 | | 7/2004 |
| JP | 2005083170 | | 3/2005 |
| JP | 2005-163456 | | 6/2005 |
| JP | 2006144279 | | 6/2006 |
| JP | 2006-299640 | | 11/2006 |
| WO | 0069670 | A1 | 11/2000 |
| WO | 2005052290 | A1 | 6/2005 |
| WO | 2009060730 | A1 | 5/2009 |
| WO | 2009068009 | A2 | 6/2009 |
| WO | WO 2010010471 | A2 * | 1/2010 |

OTHER PUBLICATIONS

Machine translation of DE 102008064458.*
Wikipedia page of "Linear Motor," obtained Sep. 20, 2017.*
Wikipedia page of "Linear Actuator," obtained Sep. 20, 2017.*
Japanese Office Action dated May 13, 2013.
Translation of Korean Office Action dated Jul. 28, 2014 for Application No. 10-2012-7004036; pp. 1-3.
Chinese Office Action dated May 13, 2013.
Japanese Office Action dated Mar. 11, 2014.
International Search Report for application No. PCT/EP2010/004295 dated Apr. 21, 2011.

* cited by examiner

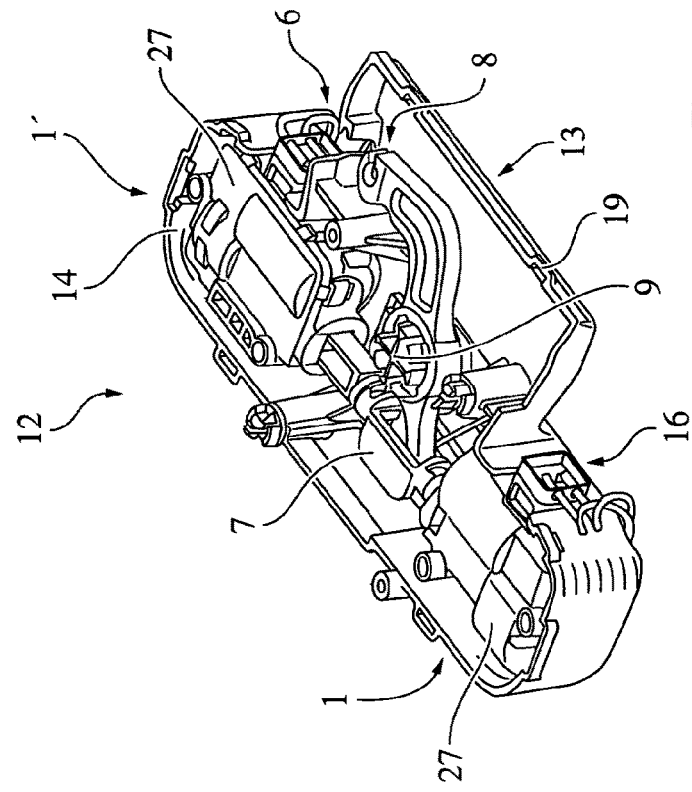
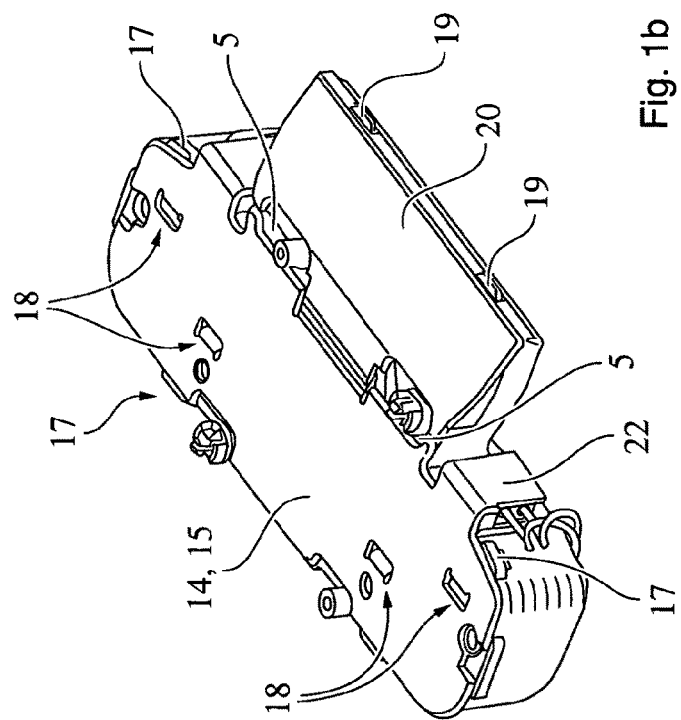
Fig. 1a
Fig. 1b

MECHATRONIC UNLOCKING MEANS

CROSS REFERENCE TO RELATED APPLICATIONS

This application claims priority from and the benefit of PCT Application No. PCT/EP2010/004295, filed on Jul. 14, 2010, entitled "Mechatronic Unlocking Means and German Patent DE 10 2009 033 491.2, filed on Jul. 15, 2009, which are herein incorporated by reference.

BACKGROUND

The present invention relates to a drive device for a Bowden control having at least one electric actuator and one mechanism, which is connected to the Bowden control, wherein the actuator and the mechanism are surrounded by at least one housing.

Adjusting and/or unlocking mechanisms are known from the prior art, e.g. WO 00/69670, U.S. Pat. No. 4,448,381, G 84 32 489, DE 19 642 993, DE 100 218 63 A1, DE 203 204 19 U1 and DE 21 2006 000 002 U1. Especially in vehicle manufacture, however, there is a need to simplify even known modules and/or to facilitate the assembly thereof.

SUMMARY

It was therefore the object of the present invention to make available a drive device which is of simple construction and is simple to assemble.

The object is achieved by means of a drive device for a Bowden control having at least one electric actuator and one mechanism, which is connected to the Bowden control, wherein the actuator and the mechanism are surrounded by at least one housing, and the housing has a closable cover in the connecting region between the mechanism and the Bowden control.

The present invention relates to the drive device for a Bowden control. Drive devices of this kind actuate the core of the Bowden control, for example, in order to unlock the backrest of a vehicle seat for adjustment, for example, or in order to open a trunk lid or the like, for example.

According to the invention, said drive device has at least one, and preferably two or more, actuators. The actuators are preferably electric motors, in particular electric linear drives. According to the invention, these actuators interact with a mechanism. This mechanism can have one or more gearwheels and/or one or more levers, wherein the Bowden control, in particular the core thereof, is connected to a moving part of said mechanism, in particular to the output, e.g. to a gearwheel or a lever.

According to the invention, the actuator and the mechanism are surrounded by at least one housing, which has a closable cover in the connecting region between the mechanism and the Bowden control, i.e. in that location or region of the mechanism in which the Bowden control is connected to the mechanism. This makes it possible to connect the Bowden control to the mechanism and then to close the cover, allowing very simple assembly. The connecting region between the mechanism and the Bowden control is nevertheless protected from mechanical influences and/or contamination.

The cover is preferably provided in a jointed manner on the housing, in particular on the lid thereof. The lid and the cover are preferably provided as integral components, and the joint is, in particular, a film hinge.

According to another preferred subject or subject according to the invention of the present invention, the housing in which the actuator is situated has a spring means, which interacts with the actuator and fixes the latter in at least one spatial direction. This makes it possible to provide the actuator with a relatively weak housing and/or with a housing which is only clipped since the housing of the drive device according to the invention provides additional stabilization for the housing of the actuator.

The spring means and/or the cover is/are preferably provided on the lid of the housing, and in particular are in each case provided as integral components thereon.

The housing furthermore preferably has a cable duct, in which a power cable, in particular an electric power cable, can be routed to the respective actuator. The cable duct preferably has retaining means for the cable in order to prevent the cable from coming out of the cable duct. The cable duct furthermore preferably has stabilizing means.

The housing furthermore preferably has a power terminal cover. This preferred embodiment of the present invention has the advantage that power terminal regions, e.g. plug connector regions, of the drive device according to the invention are covered, ensuring that they are exposed to only slight mechanical stresses and/or contamination, if any. These power terminal covers are preferably part of the lid.

DRAWINGS

The inventions are explained below with reference to FIGS. 1-12. These explanations are given purely by way of example and do not restrict the general inventive concept. The explanations apply equally to all the subjects of the present invention.

FIG. 1 shows a first embodiment of the drive device according to the invention.

Figure 11:
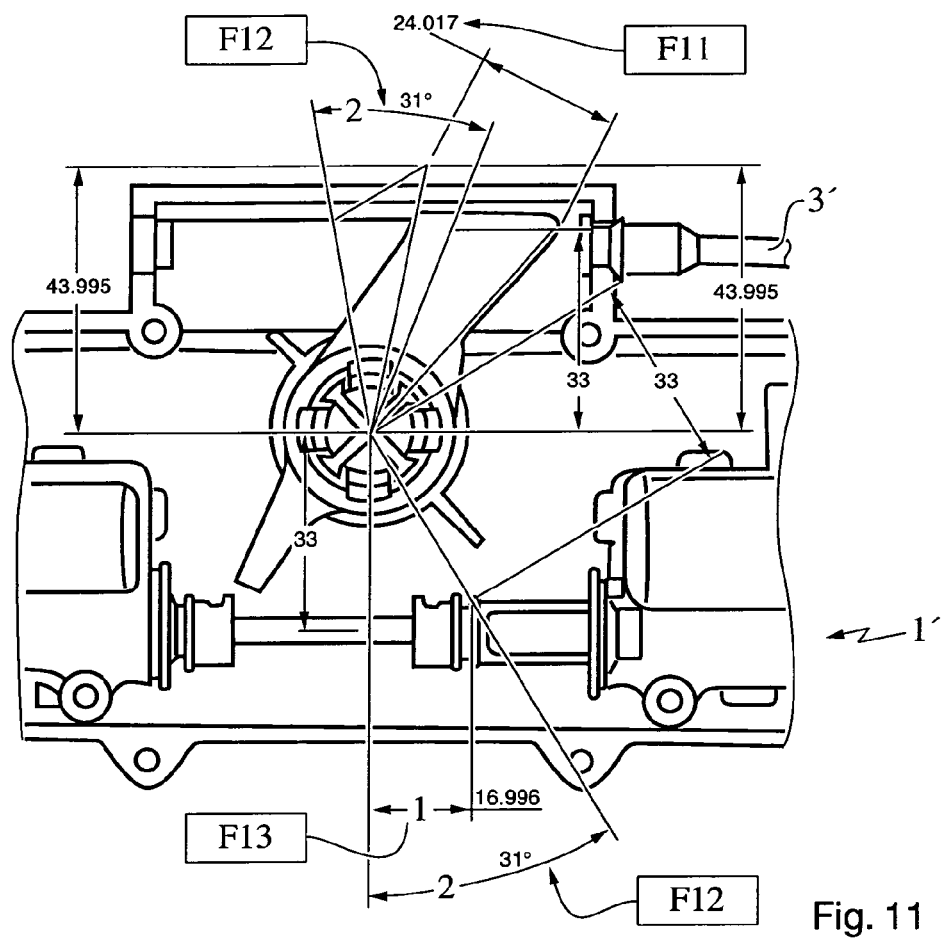
Figure 12:
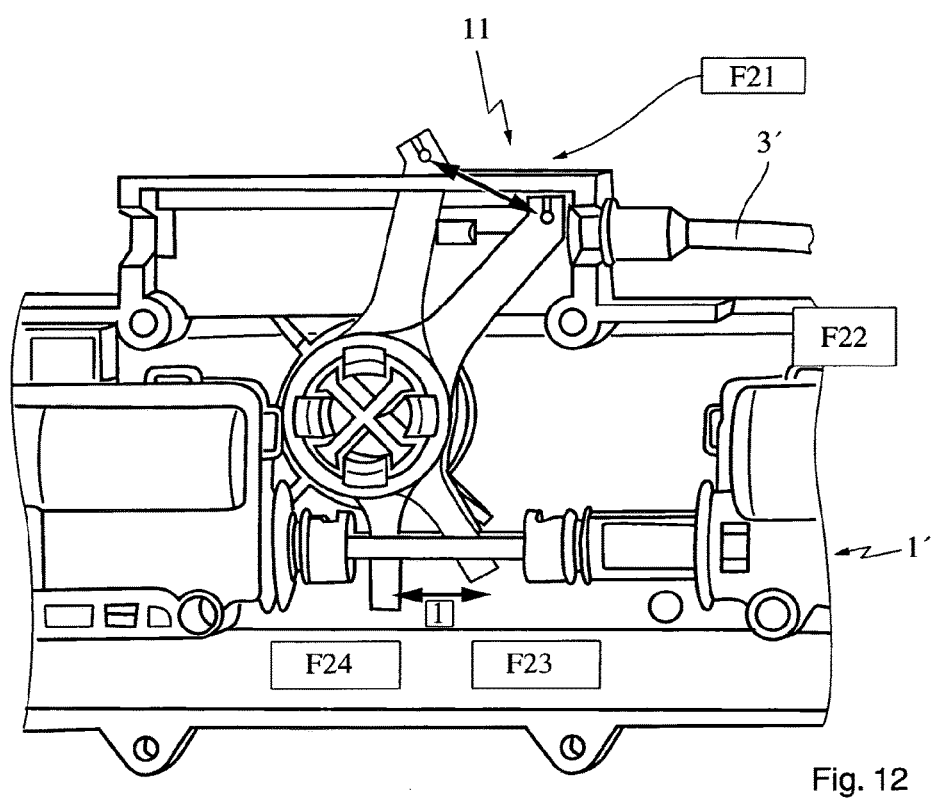
Figure 13:
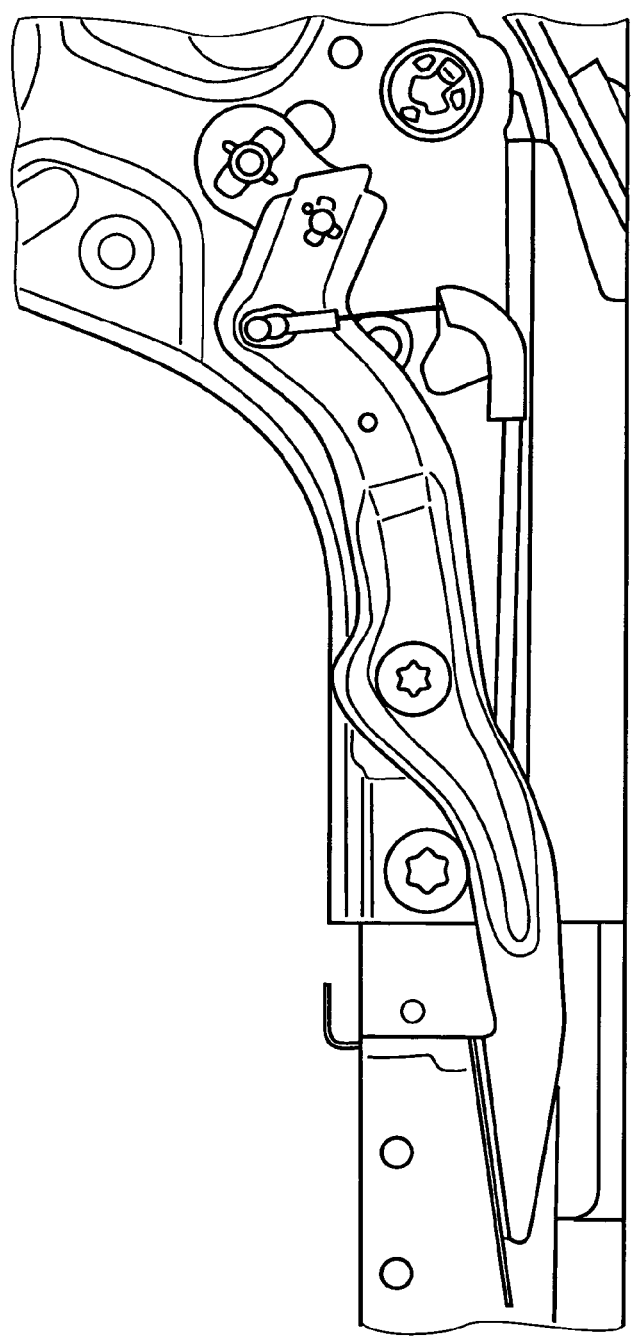

FIGS. 11 and 12 each show an actuator for unlocking vehicle seat back adjusting devices in schematic partial cutaway representation, and FIG. 13 shows a diagram intended to illustrate the required worst-case force.

DETAILED DESCRIPTION

FIG. 1 shows a first embodiment of the drive device according to the invention. This has a housing 14, wherein the lid 15 of the housing 14 has been omitted in the illustration in FIG. 1a. In the housing there are two actuators 1,1' provided, in this case electric linear actuators, which drive a mechanism component 7, in this case a lever, which is provided in such a way as to be rotatable about the pivot 9. In its region opposite the drive region, this lever has a cable connecting device 8, in this case an eye, into which the core of a Bowden control (not shown) can be inserted. The sheath of the Bowden control is secured in the housing 14, as will be seen in detail below. The lever ratios of the lever 7 are provided as a step-up ratio, i.e. a relatively small movement of the actuators 1, 1' leads to a relatively large movement of the cable connecting device 8. Accordingly, the lever 7 has two arms, the lever 7 is configured to be driven by the actuator(s) via a first arm of the two arms, a second arm of the two arms is configured to couple to a core of the Bowden cable (e.g., via the cable connecting device 8), and the second arm is longer than the first arm. Each of the actuators 1, 1' has a housing 27, which is of two-part design, wherein the connection between the two parts is of relatively weak configuration and can absorb only slight forces. For this reason, the housing 14, 15 of the drive device according to the invention, in this case the lid 15, has spring means 18, which, as can be seen better in FIG. 2, in particular, press on the housing 27 of the actuators 1 and thereby, on the one hand, additionally hold the two housing parts of the actuators together and/or stabilize the actuators, at least in one spatial direction. Each actuator has a separate power terminal 16, which, as can be seen in FIG. 1*b*, in particular, is provided with a cover 22. As a result, the power terminals, e.g. a cable and/or a plug connector terminal, are better protected from mechanical influences. The lid 15 is connected to the housing 14, preferably by means of latching connections. The same applies to the cover 19, the connection of which to the housing 14 is likewise preferably provided as a latching connection. This makes it possible to secure the lid 15 on the housing 14 without tools and to lock the cover 20 to the housing 14 without tools.

Figure 2:
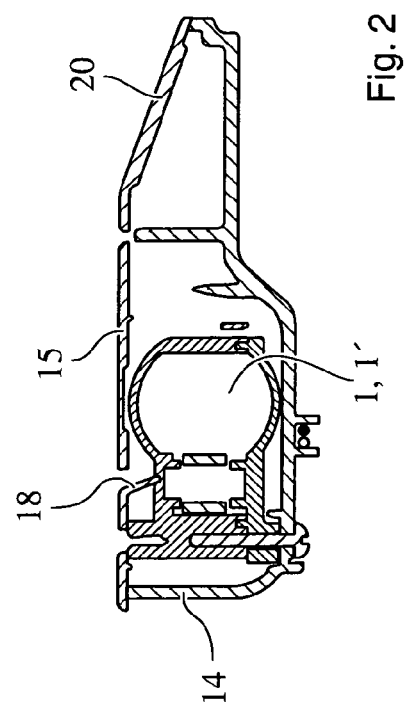
FIG. 2 shows the spring means.

FIG. 2 shows a section through the drive device shown in FIG. 1. It is clearly apparent how the spring means 18 is preloaded against the housing of the actuator 1, 1' and thereby holds the latter together and/or secures the actuator in position.

Figure 3A:
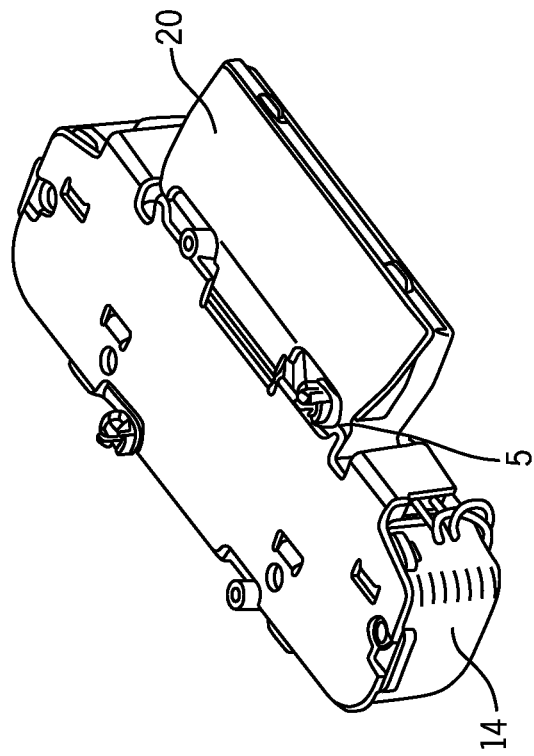
FIG. 3 shows another illustration of the drive device shown in FIG. 1.
Figure 3B:
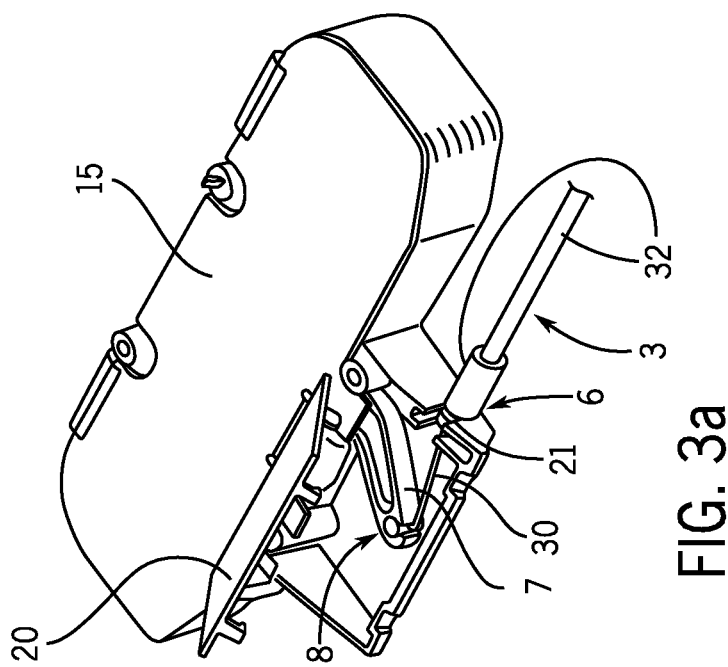

FIG. 3 shows the closing of the cover 20. As illustrated in FIG. 3*a*, the covering device is supplied to the assembly line with an open cover. A Bowden cable (not shown) is then passed through the cable fastening guide 6, the sheath of the Bowden cable is secured in the recess 21, and the core of the cable is connected to the lever 7. The cover 20 is then closed (FIG. 3*b*) and latched to the housing 14. On the one hand, this protects the mechanism, in particular the lever 7, and, on the other hand, secures the connection between the housing 14 and the sheath of the Bowden control.

Figure 4A:
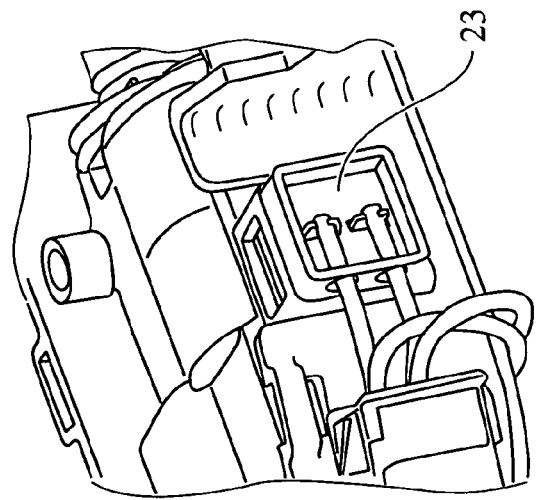
FIG. 4 shows the power terminal region.
Figure 4B:
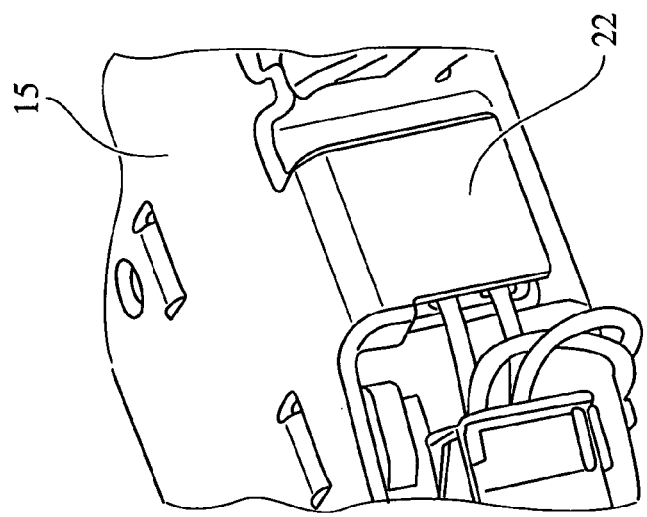

FIG. 4 shows the power supply for the drive device according to the invention. As can be seen in FIG. 4*a*, this power supply in this case has electrical terminals in the form of plug connectors. These plug connectors are secured, especially from mechanical influences and/or contamination, by covers 22 (cf. FIG. 4*b*). This cover is preferably provided on the lid, in particular as an integral component.

Figure 5:
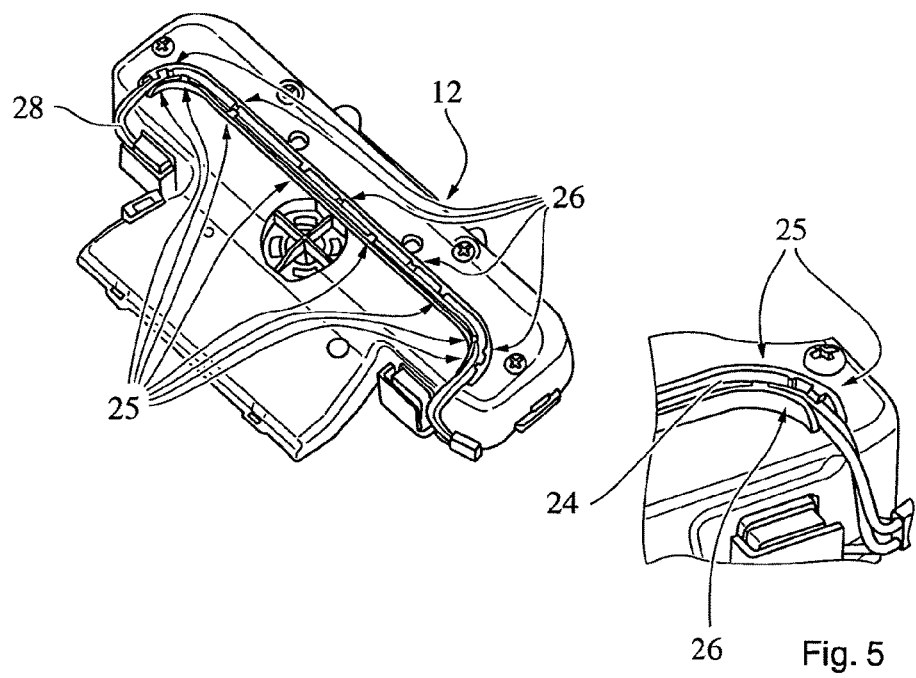
FIG. 5 shows the cable duct.

FIG. 5 shows a cable duct 24, which is provided on the opposite side of the housing from the lid. In this duct, the cable 28 is guided and stabilized mechanically in such a way that tensile forces do not act on the plug connection. For this purpose, the cable duct has, on the one hand, retaining means, in this case retaining lips 25, which ensure that the cable does not slip out of the cable duct. Moreover, the cable duct has ribs 26, which, on the one hand, increase the stability of the cable duct but also preferably increase the frictional force between the cable duct and the cable. The cable duct 24 can increase the stability of the housing 14.

Figure 6:
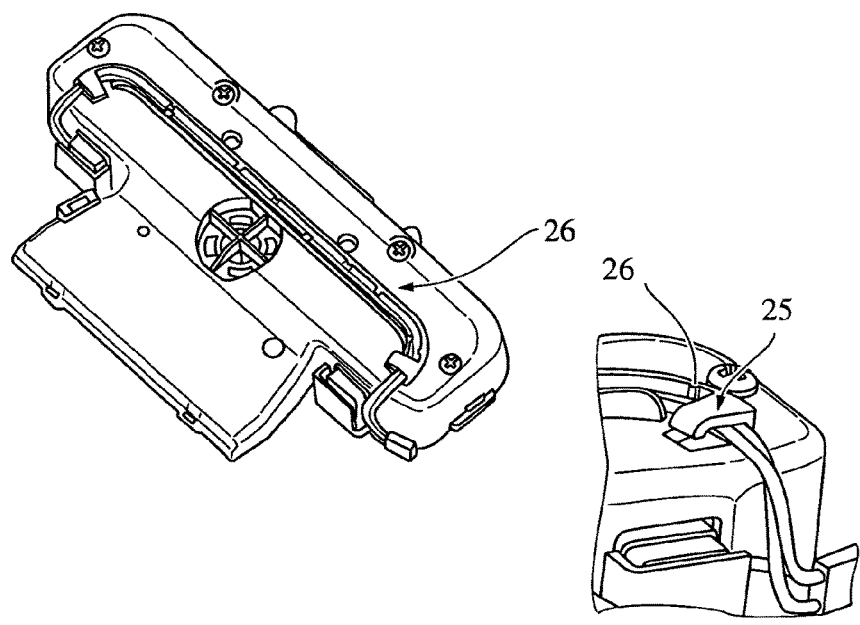
FIG. 6 shows details of the cable duct shown in FIG. 5.

FIG. 6 shows a detail of the cable duct, in this case, in particular, the retaining means 25, which is provided as a flexible retaining lip.

Figure 7:
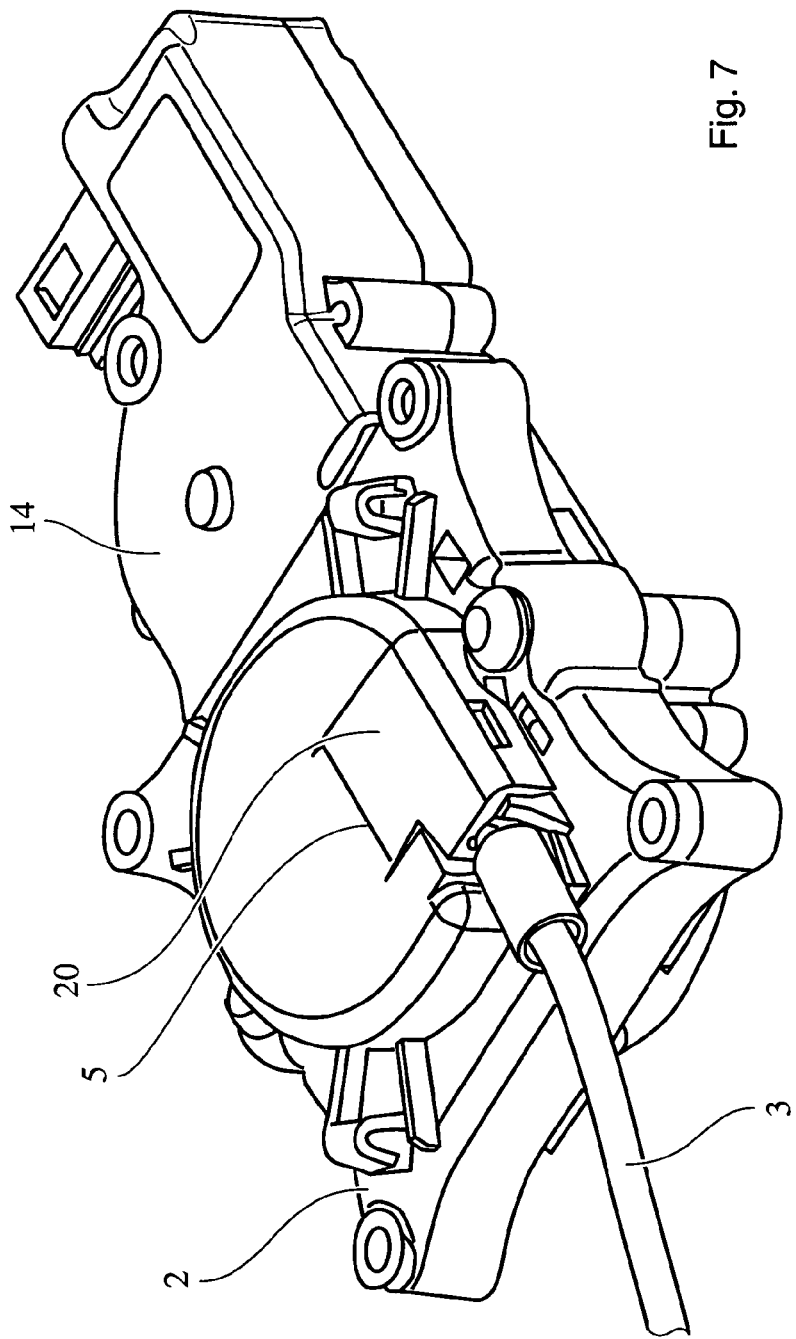
FIG. 7 shows another embodiment of the drive device according to the invention.

FIG. 7 shows a drive device configured in accordance with the invention in a schematic perspective illustration. In the present case, the drive device has a housing 14 for the actuator and a housing 2 for the mechanism, which are connected to one another. The drive device is used to unlock a seat back adjuster. A Bowden cable 3, which is shown only in part, extends from the drive device 12 into the space.

Figure 8:
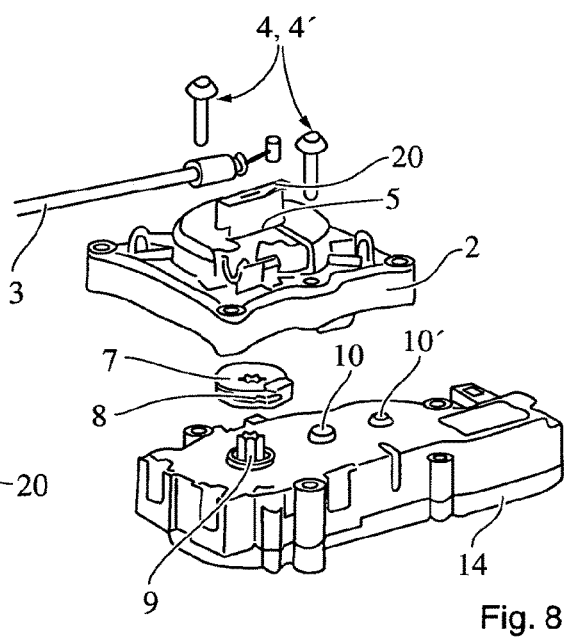
FIG. 8 shows an exploded drawing of the drive device shown in FIG. 7.

FIG. 8 shows the drive device 12 configured in accordance with the invention in an exploded illustration, said device having the mechanism housing 2 and the Bowden cable 3, two fastening screws 4, 4' and a cover 20, which is provided in a jointed manner 5 on the housing 2. The adapter housing 2 also includes a cable fastening guide 6, by means of which the Bowden cable is guided into the housing 2 and in the region of which the sheath of the Bowden cable is connected to the housing 2. In this region, the Bowden cable, in particular the core thereof, is also connected to the mechanism, in this case a cable pulley 7. By means of the screws 4, 4', housing 2 is secured on housing 14. The drive device 12 configured in accordance with the invention furthermore includes the electric actuator 1, 1', which is provided with a drive spindle 9, a first fixing pin 10 associated with adapter housing 2 and a second fixing pin 10' associated with the vehicle seat (not shown).

Figure 9:
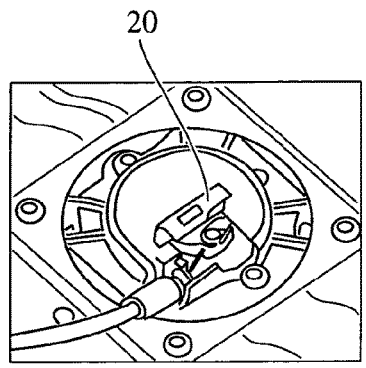
FIG. 9 shows the cover in the opened state.
Figure 10:
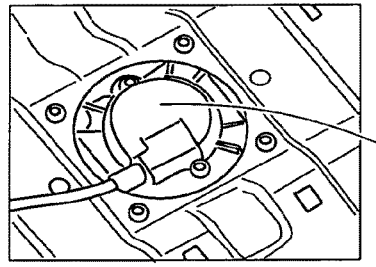
FIG. 10 shows the cover in the closed state.

FIG. 9 shows the cover 20 in the opened state, in which the Bowden control 3 is connected to the cable pulley 7. The cover 20 is then pivoted around the joint 5, i.e. closed, and the cover 20 is latched to the housing 2, this being illustrated in FIG. 10. The cable pulley 7, the connection between the cable pulley 7 and the Bowden cable 3 and the attachment of the Bowden cable 3 to the housing 2 are now protected and secured.

The assembly sequence will be described in detail below:

In a pre-assembly step, the actuator housing 14 is first of all pre-mounted on the mechanism housing 2, using the first fixing pin 10 for example, and is supplied to an assembly line, for example, in this state. The end of the core of the Bowden cable 3 is then hooked into the cable pulley 7. The sheath of the Bowden cable 3 is inserted into the cable fastening guide 6 belonging to the mechanism housing 2. In a final assembly step, the cover 20 is swung shut until a latching position is reached. The entire drive device 12 is then attached to the vehicle seat, for example.

FIGS. 11 and 12 each show in schematic partial cutaway representation an actuator 1, 1' for unlocking a vehicle seat back adjusting device, for example. When the actuator 1' performs a stroke of, for example, 17 mm (1 mm is assumed for the idle travel of the actuator), a lever 11 will turn through 31°, for example, and the Bowden cable 3' is tightened by 24 mm, for example, in the corresponding direction. 154 N, for example, is assumed as a value for the forces applied by the actuator V. The effective force exerted on the cable, i.e. in this case the recliner lever pin, will vary between 115 N and 154 N because the vertical distance varies between 33 mm and 43.9 mm, for example. The words which are to be inserted into the fields F11, F12 and F13 bounded by a rectangular box to supplement FIG. 11 are shown in table form below.

In the left-hand column of the following table 1, the reference numbers of the fields are listed consecutively, while the respectively associated words are indicated in the right-hand column of table 1.

TABLE 1

| Reference number | Words |
|---|---|
| F11 | Displacement of the Bowden cable (in mm) |
| F12 | Rotation of the lever (in degrees) |
| F13 | Actuator stroke |

The words which are to be inserted into the fields F21, F22, F23 and F24 bounded by a rectangular box to supplement FIG. 12 are shown in table form below.

In the left-hand column of the following table 2, the reference numbers of the fields are listed consecutively, while the respectively associated words are indicated in the right-hand column of table 2.

TABLE 2

| Reference number | Words |
|---|---|
| F21 | Displacement of the Bowden cable (24 mm) |
| F22 | Rotation of the lever (31 degrees) |
| F23 | Actuator stroke (17 mm) |
| F24 | Actuator idle travel of 1 mm |

FIG. 13 shows a diagram intended to illustrate the required worst-case force. The required worst-case force for the unlocking unit is 150 N plus the frictional loss in the Bowden cable.

LIST OF REFERENCE SYMBOLS 1, 1' electric actuator
2 mechanism housing
3, 3' Bowden cable
4, 4' fastening screws, strip-shaped sections
5 joint, hinge
6 cable fastening guide
7 mechanism component, cable pulley, lever
8 cable connecting device
9 pivot, drive spindle
10 first fixing pin
10' second fixing pin
11 lever
12 drive device
13 mechanism
14 housing
15 lid
16 power terminal cover
17 lid/housing connection, latching connection
18 spring means
19 cover/housing connection
20 cover
21 recess for the sheath of the Bowden control
22 cover for the electric terminal
23 power terminal, electric terminal
24 cable duct
25 retaining means, retaining lip
26 stabilizing means, rib
27 housing of the actuator 1, 1'
28 cable

The invention claimed is:

1. A drive device for a Bowden cable comprising:
at least one electric actuator, wherein the at least one electric actuator comprises an electric linear actuator;
a mechanism configured to connect to the Bowden cable, wherein the mechanism comprises a lever rotatable about a pivot, the lever has two arms, the lever is configured to be driven by the electric linear actuator via a first arm of the two arms, a second arm of the two arms is configured to couple to a core of the Bowden cable, and the second arm is longer than the first arm; and
at least one housing surrounding the at least one electric actuator and the mechanism, wherein the at least one housing comprises an outer housing having a closable cover in a connecting region between the mechanism and the Bowden cable;
wherein the closable cover is provided on a lid of the outer housing, and the closable cover is connected to the lid by a joint;
wherein the lid and the closable cover are integral components, the joint comprises a film hinge, the lid is securable to a bottom portion of the outer housing without tools via a latching connection, and the outer housing comprises a power terminal cover, which forms a portion of the lid;
wherein the at least one housing comprises an actuator housing embedded within the outer housing and comprising two holding parts configured to receive the electric linear actuator; and
wherein the at least one housing comprises a spring provided on the lid of the outer housing, and the spring is configured to interact with the actuator housing to hold the two holding parts of the actuator housing together about the electric linear actuator to secure the electric linear actuator within the actuator housing and to fix the electric linear actuator in at least one spatial direction.

2. The drive device as claimed in claim 1, wherein the outer housing comprises a cable duct.

3. The drive device as claimed in claim 2, wherein the cable duct comprises a cable retaining device.

* * * * *